United States Patent
Lawrence

(10) Patent No.: US 9,228,690 B2
(45) Date of Patent: Jan. 5, 2016

(54) APPARATUS AND METHOD FOR REPAIRING AN EXISTING SPILL CONTAINMENT MANHOLE

(71) Applicant: Emco Wheaton Retail Corporation, Wilson, NC (US)

(72) Inventor: James L. Lawrence, Wilson, NC (US)

(73) Assignee: Emco Wheaton Retail Corporation, Wilson, NC (US)

( * ) Notice: Subject to any disclaimer, the term of this patent is extended or adjusted under 35 U.S.C. 154(b) by 0 days.

(21) Appl. No.: 13/867,010

(22) Filed: Apr. 19, 2013

(65) Prior Publication Data

US 2013/0233402 A1    Sep. 12, 2013

Related U.S. Application Data

(63) Continuation of application No. 12/662,118, filed on Mar. 31, 2010, now Pat. No. 8,425,145.

(51) Int. Cl.
| | |
|---|---|
| *F16L 55/18* | (2006.01) |
| *B65D 90/10* | (2006.01) |
| *B67D 7/32* | (2010.01) |
| *B67D 7/78* | (2010.01) |

(52) U.S. Cl.
CPC ............. *F16L 55/18* (2013.01); *B65D 90/105* (2013.01); *B67D 7/3209* (2013.01); *B67D 7/78* (2013.01); *B65D 2590/0075* (2013.01); *Y10T 29/4973* (2015.01); *Y10T 137/0402* (2015.04); *Y10T 137/598* (2015.04)

(58) Field of Classification Search
USPC ............... 404/25, 26; 405/129.75, 52; 141/86
See application file for complete search history.

(56) References Cited

U.S. PATENT DOCUMENTS

| | | | | |
|---|---|---|---|---|
| 3,621,623 A | * | 11/1971 | Downes | 404/25 |
| 4,552,166 A | * | 11/1985 | Chadbourne et al. | 137/15.04 |
| 4,579,155 A | * | 4/1986 | Zola | 141/86 |
| 4,763,806 A | * | 8/1988 | Podgers et al. | 220/86.1 |
| 4,793,387 A | * | 12/1988 | LeBlanc et al. | 141/86 |
| 4,896,705 A | * | 1/1990 | Podgers et al. | 141/86 |
| 5,044,822 A | * | 9/1991 | Moss | 405/52 |
| 5,058,633 A | * | 10/1991 | Sharp | 141/86 |
| 5,101,868 A | * | 4/1992 | Balch | 141/86 |
| 5,114,271 A | * | 5/1992 | Sunderhaus et al. | 405/52 |
| 5,222,832 A | * | 6/1993 | Sunderhaus et al. | 405/52 |
| 5,265,981 A | * | 11/1993 | McNeil | 405/303 |
| 5,415,499 A | * | 5/1995 | Hyde-Smith et al. | 405/303 |
| 5,490,744 A | * | 2/1996 | McNeil | 405/303 |

(Continued)

*Primary Examiner* — Abigail A Risic
(74) *Attorney, Agent, or Firm* — Merek, Blackmon & Voorhees, LLC

(57) ABSTRACT

An apparatus for repairing an existing spill containment manhole operably associated with an underground fuel storage tank. The apparatus includes a containment vessel for containing fuel spilled during filling of the underground fuel storage tank. A major portion of the containment vessel is adapted to be inserted into an existing spill containment manhole. Preferably, the containment vessel includes an upper annular flange that extends over and surrounds a portion of an existing cover rim of an existing spill containment manhole thereby isolating an upper portion of the containment vessel from an upper portion on the existing spill containment manhole when the containment vessel is installed. Optionally, a replacement cover is provided to replace an existing cover of the existing spill containment manhole. The replacement cover may include at least one sealing member that engages the inner surface of the at least one wall of the containment vessel when installed.

11 Claims, 5 Drawing Sheets

(56) References Cited

U.S. PATENT DOCUMENTS

| | | | | |
|---|---|---|---|---|
| 6,527,476 B1 * | 3/2003 | Pettesch | | 404/26 |
| 7,171,994 B1 * | 2/2007 | O'Brien | | 141/311 A |
| 7,913,722 B2 * | 3/2011 | Dorst | | 141/86 |
| 2007/0116518 A1 * | 5/2007 | Tortorici | | 404/25 |
| 2007/0144606 A1 * | 6/2007 | O'Brien | | 141/86 |
| 2010/0071804 A1 * | 3/2010 | Rowe | | 141/86 |

* cited by examiner

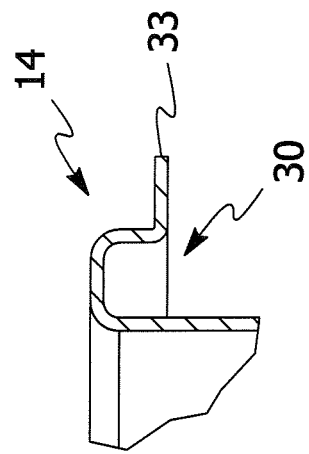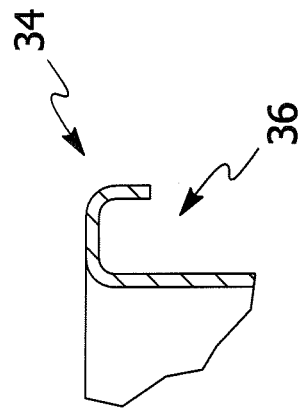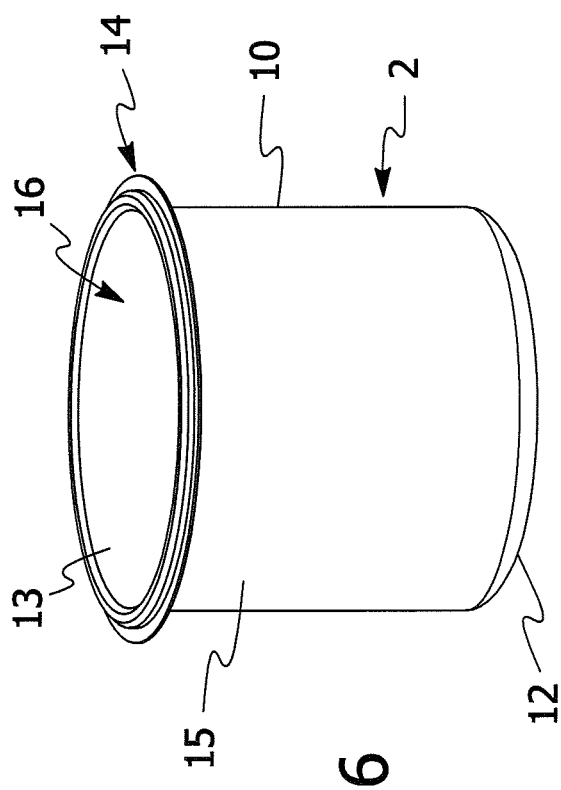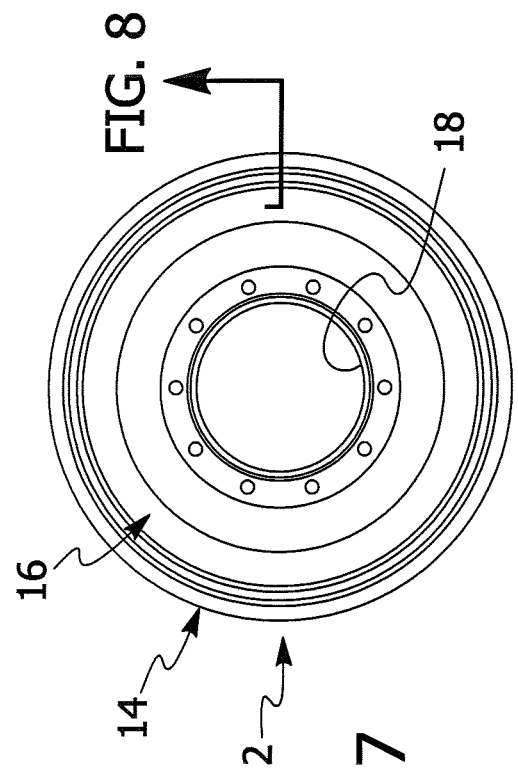

APPARATUS AND METHOD FOR REPAIRING AN EXISTING SPILL CONTAINMENT MANHOLE

RELATED APPLICATIONS

The subject patent application is a continuation of U.S. patent application Ser. No. 12/662,118 filed on Mar. 31, 2010. The entire content of U.S. patent application Ser. No. 12/662,118 is incorporated herein by reference.

FIELD OF THE INVENTION

The present invention relates to spill containment manholes that are operably associated with underground fuel storage tanks. More particularly, the present invention relates to an apparatus for repairing an existing spill containment manhole. The phrase "repairing an existing spill containment manhole" as used herein includes upgrading an existing spill containment manhole as well as servicing an existing spill containment manhole that is leaking or suspected to leak in the future.

BACKGROUND OF THE INVENTION

A variety of spill containment devices or manholes have been employed to prevent contamination of the surrounding environment during the process of filling underground storage tanks with hazardous liquids including fuels like gasoline. Service stations dispensing gasoline, diesel, and other fuels commonly employ underground storage tanks for storing various types of fuels. The underground storage tanks typically include a riser pipe through which the fuel is dispensed from and transferred to the underground storage tank. The riser pipe is connected to and extends upwardly from an opening in the underground fuel storage tank.

A pipe section commonly known as a fill port or nipple is typically connected to the riser pipe. A removable fill cap is usually secured to the fill port or nipple. The fill cap is removed to fill the underground fuel storage tank.

Spill containment manholes or devices have been used to provide access to the fill port of the underground fuel storage tank and prevent contamination of the surrounding environment. For example, fuel can and does spill when the dispensing hose from the fuel truck is connected or disconnected to the fill port. In addition, fuel spills may occur if the underground storage tank is overfilled. The spill containment manholes or devices were designed to trap spilling fuel to prevent contamination of the surrounding environment. Specifically, the spill containment manhole or device surrounds and contains the fill port or nipple. By providing a containment vessel surrounding the fill port, the spill containment manhole or device can prevent fuel spills caused during the process of filing the underground fuel storage tank from contaminating the environment.

The spill containment manhole or device typically includes a removable cover to allow an individual to access the fill cap and fill port. The spill containment manhole or device may have a drain operably connected to the riser pipe to drain any fuel trapped by the spill containment manhole back into the underground fuel storage tank.

Over time the spill containment manhole or device deteriorates making it considerably more likely that a crack or other imperfection will form allowing fuel to leak into the surrounding environment that normally would have been trapped by the spill containment manhole or device. Attempts have been made to provide a bucket or liner that can be inserted into an existing manhole to repair an existing leak or potential leak. One such product is THE LINEBACKER™ made by JGD Products, LLC. This product has several inherent disadvantages. First, the bucket or liner does not extend up to the ground surface. Therefore, the bucket or liner does not isolate the existing spill containment manhole. Rather, at least an upper portion of the existing spill containment manhole must be relied upon to prevent fuel from leaking into the surrounding environment. Further, this design requires a sealant be applied to the vertical wall of the bucket or liner and the adjacent portion of the existing spill containment manhole inside of the containment area of the existing spill containment manhole. Therefore, if the sealing material deteriorates overtime or is incorrectly applied in the first instance, fuel can escape into the surrounding environment through the defective or deteriorated seal. Another disadvantage of this product is that the same removable cover is typically reused. THE LINEBACKER™ bucket or liner does not provide a direct seal with the removable cover. In other words, the removable cover does not seal directly to the THE LINEBACKER™ bucket or liner. Again the bucket or liner fails to isolate the existing spill containment manhole. Rather, at least an upper portion of the existing spill containment manhole must be relied upon to prevent fuel from leaking into the surrounding environment. Another disadvantage with this product is that it uses a bulky connector for connecting the bucket or liner in a fluid tight manner to the fill port and/or corresponding coupling or fitting. This is undesirable as there is limited space. A further disadvantage of this product is that it does not include a vehicle for draining fuel back into the underground fuel storage tank from the bucket or liner.

OBJECTS AND SUMMARY OF THE INVENTION

An object of a preferred embodiment of the present invention is to provide a novel and unobvious apparatus for repairing an existing spill containment manhole or device.

Another object of a preferred embodiment of the present invention is to provide a kit for repairing an existing spill containment manhole without breaking the concrete or asphalt layers retaining an existing cover rim.

A further object of a preferred embodiment of the present invention is to provide a kit for repairing an existing spill containment manhole or device that isolates the existing spill containment manhole or device.

Still a further object of a preferred embodiment of the present invention is to provide a kit for repairing an existing spill containment manhole or device where the kit includes a replacement cover and a containment vessel where the replacement cover is sealed directly to the containment vessel when installed.

Yet still another object of a preferred embodiment of the present invention is to provide a containment vessel that can be readily inserted into an existing spill containment manhole where no seal is required between a vertical wall of the containment vessel and the adjacent area of the existing spill containment manhole.

Yet another object of a preferred embodiment of the present invention is to provide a containment vessel that is designed to extend over an inner portion of an existing cover rim to eliminate the need for a sealant between a vertical wall of the containment vessel and the adjacent area of the existing spill containment manhole.

Still a further object of a preferred embodiment of the present invention is to provide a containment vessel that includes a compact seal assembly that provides a fluid tight seal between the bottom of the containment vessel and the fill port.

Another object of a preferred embodiment of the present invention is to provide a kit for repairing an existing spill containment manhole or device where the kit includes a containment vessel and means for draining the containment vessel.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a kit for repairing an existing spill containment manhole operably associated with an underground fuel storage tank. The kit includes a containment vessel for containing fuel spilled during filling of the underground fuel storage tank. A major portion of the containment vessel is adapted to be inserted into an existing spill containment manhole. The containment vessel includes at least one wall that surrounds an existing pipe section operably associated with the underground fuel storage tank when the containment vessel is installed. The at least one wall has an inner surface and an outer surface. The kit further includes a replacement cover to replace an existing cover of the existing spill containment manhole. The replacement cover has at least one sealing member that engages the inner surface of the at least one wall of the containment vessel when installed.

Another embodiment of the present invention is directed to a kit for repairing an existing spill containment manhole operably associated with an underground fuel storage tank. The kit includes a containment vessel for containing fuel spilled during filling of the underground fuel storage tank. A major portion of the containment vessel is adapted to be inserted into an existing spill containment manhole. The containment vessel includes at least one wall that surrounds an existing pipe section operably associated with the underground fuel storage tank when the containment vessel is installed. The at least one wall has an inner surface and an outer surface. The containment vessel further includes an annular flange disposed adjacent an upper portion of the at least one wall. The annular flange extends over and surrounds a portion of an existing cover rim of an existing spill containment manhole thereby isolating an upper portion of the containment vessel from an upper portion on the existing spill containment manhole when the containment vessel is installed.

A further embodiment of the present invention is directed to a kit for repairing an existing spill containment manhole operably associated with an underground fuel storage tank. The kit includes a containment vessel for containing fuel spilled during filling of the underground fuel storage tank. A major portion of the containment vessel is adapted to be inserted into an existing spill containment manhole. The containment vessel includes at least one wall that surrounds an existing pipe section operably associated with the underground fuel storage tank when the containment vessel is installed. The at least one wall has an inner surface and an outer surface. The containment vessel has a bottom with an opening formed therein for receiving the existing pipe section when the containment vessel is installed. The containment vessel further includes a drain valve and a conduit for connecting the drain valve to a drain in an existing spill containment manhole. The conduit is adapted to wrap around the existing pipe section when the conduit is installed.

Still a further embodiment of the present invention is directed to a method of repairing an existing spill containment manhole operably associated with an underground fuel storage tank, the method comprising the steps of: (i) providing a containment vessel for containing fuel spilled during filling of the underground fuel storage tank, the containment vessel including at least one vertically extending wall that when installed surrounds an existing pipe section operably associated with the underground fuel storage tank, the at least one vertically extending wall having an inner surface and an outer surface; (ii) providing a replacement cover to replace an existing cover of the existing spill containment manhole, the replacement cover having at least one sealing member that engages the inner surface of the at least one wall of the containment vessel; (iii) removing an existing cover of an existing spill containment manhole from an existing cover rim, (iv) inserting the containment vessel into the existing spill containment manhole without disturbing the existing surrounding retaining structure for retaining the existing rim cover of the existing spill containment manhole; and, (v) placing the replacement cover in the existing rim cover so that the annular seal engages an inner surface of the at least one wall of the containment vessel.

BRIEF DESCRIPTION OF THE DRAWINGS

FIG. 6 is a perspective view of a containment vessel formed in accordance with a preferred embodiment of the present invention.

FIG. 7 is a plan view of the containment vessel depicted in FIG. 6.

FIG. 8 is an enlarged cross-sectional view of the upper flange of the containment vessel depicted in FIG. 6.

FIG. 9 is an enlarged cross-sectional view of an alternative upper flange of the containment vessel.

DETAILED DESCRIPTION OF THE PREFERRED EMBODIMENTS OF THE INVENTION

The most preferred forms of the invention will now be described with reference to FIGS. 1-11. The appended claims are not limited to the most preferred forms and no term used herein is to be given a meaning other than its ordinary meaning unless expressly stated otherwise. The phrase "repairing an existing spill containment manhole" shall be interpreted to include upgrading an existing spill containment manhole as well as servicing an existing spill containment manhole that is leaking or suspected to leak in the future.

FIGS. 1 Through 9

Figure 1:
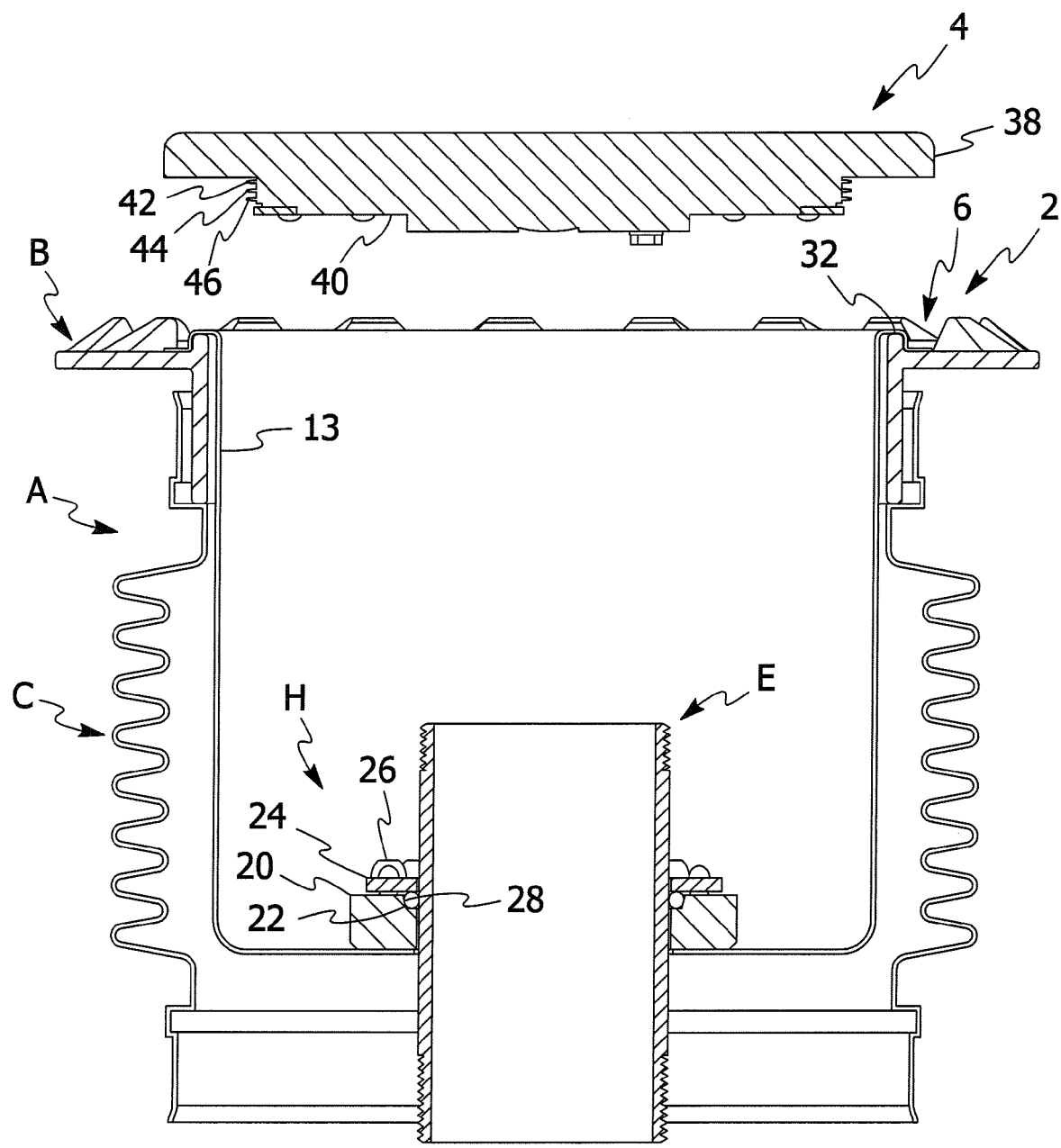
FIG. 1 is a partial, cross-sectional, exploded view of an existing spill containment manhole repaired by a preferred embodiment of the present invention.

Referring to FIGS. 1 to 3 and 5, an existing spill containment manhole A is illustrated in one of many possible configurations. As previously explained, the existing spill containment manhole A is mounted above an underground fuel storage tank (not shown). It should be noted that the removable cover of the existing spill containment manhole A illustrated in FIG. 1 has been removed and replaced with cover 4 formed in accordance with a preferred embodiment of the present invention. Further, FIG. 1 illustrates containment vessel 2 formed in accordance with a preferred embodiment of the present invention inserted into the existing spill containment manhole A.

The existing spill containment manhole A includes a cover rim B. The cover rim B includes a recessed portion 6 for receiving a removable cover. The cover rim B is typically retained in place by one or more layers of concrete or asphalt. The existing spill containment manhole A further includes an expandable body portion C. Typically, the upper end of the expandable body portion C is clamped or otherwise secured to the cover rim B while the base D is secured to a fill port or nipple E and riser pipe coupling F. It should be noted that a removable fill cap (not shown) is typically secured to the uppermost portion of the fill port or nipple E. A riser pipe (not shown) is connected at it upper under to coupling F and at its lower end to the underground fuel storage tank (not shown).

Figure 5:
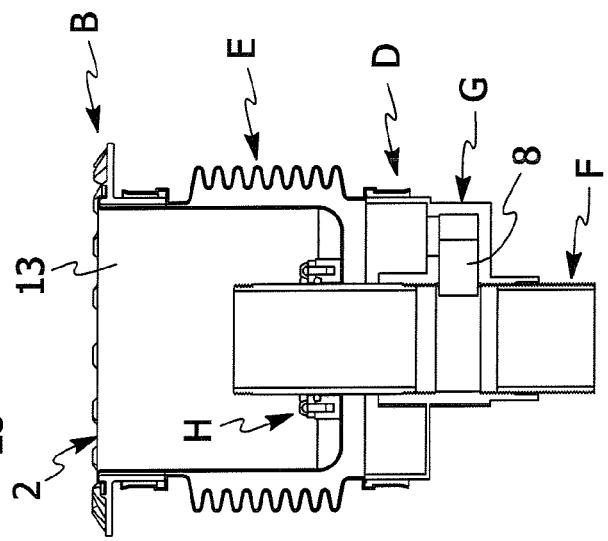
FIG. 5 is a cross-sectional view taken through lines 5-5 in FIG. 3.
Figure 2:
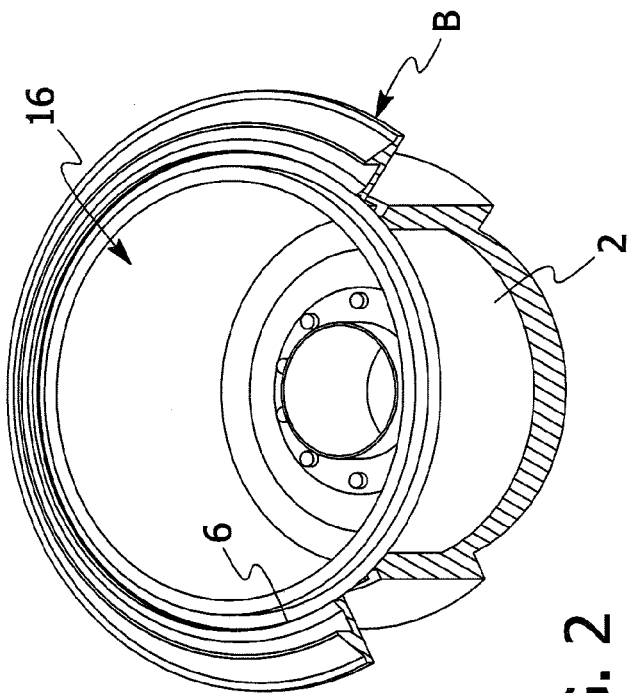
FIG. 2 is a fragmentary perspective view of a portion of an existing spill containment manhole with a containment vessel formed in accordance with a preferred embodiment of the present invention inserted therein.
Figure 3:
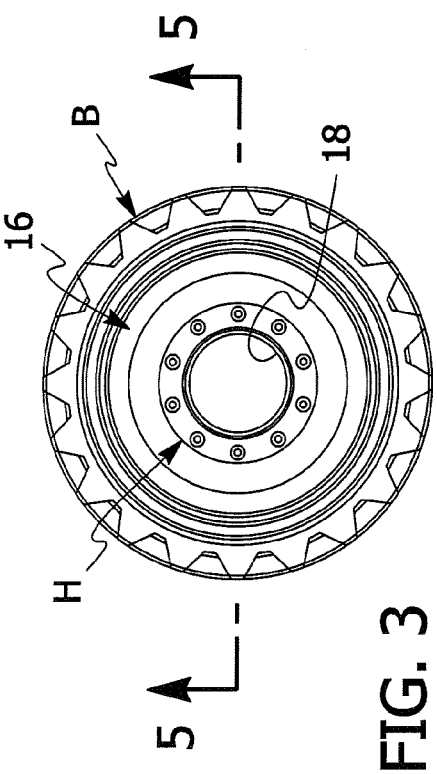
FIG. 3 is plan view of an existing spill containment manhole with a containment vessel formed in accordance with a preferred embodiment of the present invention insert therein.

Referring to FIG. 5, the existing spill containment manhole A may include a drain G configured to allow fuel collecting in the existing spill containment manhole A to drain back into the underground fuel storage tank through riser pipe coupling F. Referring to FIG. 5, a passageway 8 is formed by drain D to connect the lower containment portion of the existing spill containment manhole A to the riser pipe coupling F. It should be noted that a drain valve may be used to control the flow of fluid through drain D.

When the existing spill containment manhole A leaks or is suspected of leaking in the future, containment vessel 2 may be inserted therein to isolate the existing spill containment manhole A thereby preventing fuel from escaping into the surrounding environment even if the existing spill containment manhole A is defective.

Referring to FIGS. 6 to 8, the containment vessel 2 preferably includes one vertically extending annular wall 10 having an inner surface 13 and an outer surface 15, a horizontally extending bottom 12 and an upper flange 14. Preferably, the containment vessel 2 is made from stainless steel. However, it will be readily appreciated that any suitable material may be used to form the containment vessel 2. As seen in FIGS. 6 and 7, the containment vessel 2 preferably includes a large substantially circular opening 16 to allow an individual access to the interior of the containment vessel 2. Bottom 12 includes a suitably sized opening 18 to allow the fill port or nipple E to extend therethrough as shown in FIG. 5.

Figure 4:
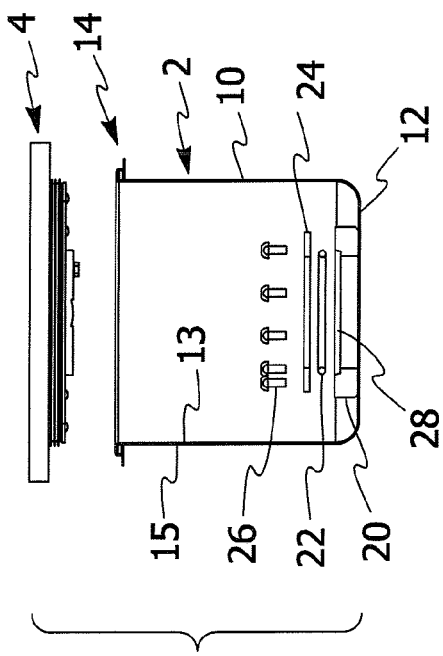
FIG. 4 is a partial, cross-sectional view of a kit for repairing an existing spill containment manhole formed in accordance with a preferred embodiment of the present invention.

The containment vessel 2 includes a compact seal assembly H. Referring to FIGS. 1 to 5 and 6, the seal assembly H includes a seal mount or flange 20, an annular seal 22, seal retaining plate 24, and a plurality of bolts 26. Referring to FIG. 4, the mount 20 includes a recessed annular groove 28 that receives annular seal 22. Mount 20 further includes a plurality of threaded recesses for receiving bolts 26. The recesses are formed outwardly from the annular groove 28.

The annular groove 28 may take many shapes including but not limited to square, rectangular, step-shaped, circular and semi-circular to accommodate different cross-sectional configurations of the annular seal. Seal retaining plate 24 can be formed in two or more pieces each have a plurality of openings for receiving bolts 26. When seal assembly H is fully assembled, the annular seal 22 engages fill port or nipple E to isolate the lower portion of containment vessel 2 from the existing spill containment manhole A.

Referring to FIGS. 6 and 8, upper flange 14 of containment vessel 2 is annular. Upper flange 14 includes a recessed portion 30 that receives inner annular portion 32 of cover rim B as seen in FIG. 1. As a result of this configuration, the upper portion of the containment vessel 2 extends to about grade level so as to eliminate the need for a sealant between an upper portion of the vessel 2 and the adjacent portion of the existing spill containment manhole A in the containment area of either vessel 2 or existing spill containment manhole A. This configuration also isolates the upper portion of vessel 2 from the upper portion of existing spill containment manhole A. Preferably, upper flange 14 includes a horizontal outwardly extending annular lip 33. Annular lip 33 rests in recessed portion 6 of cover rim B. A sealant may be placed between lip 33 and recessed portion 6 of cover rim B.

Referring to FIG. 9, an alternative configuration for the upper flange of vessel 2 is illustrated. Specifically, flange 34 includes a recessed portion 36 performing the same function as recessed portion 30. However, flange 34 omits an annular outwardly extending lip.

Referring to FIG. 1, replacement cover 4 includes a first annular portion 38 and a second annular portion 40. Second annular portion 40, when installed, extends into containment vessel 2. Second annular portion 40 preferably includes three annular sealing ribs 42, 44 and 46. The annular sealing ribs engage the inner surface 13 of annular wall 10 of containment vessel 2 so that the repair kit including the containment vessel 2 and cover 4 are isolated from the existing spill containment manhole A. When installed, replacement cover 4 is preferably at about grade level.

Installation of the repair kit including the containment vessel 2 and cover 4 can be performed quickly and easily without any need to disturb the concrete or asphalt retaining layers that retain the existing cover rim B. Specifically, installation can be readily achieved by removing the existing fill cap cover, inserting the containment vessel 2 into the existing spill containment manhole A, fully assembling the seal assembly H to provide a fluid tight seal around the fill port E and positioning the cover 4 such that the second annular portion 40 extends into containment vessel 2 such that ribs 42, 44 and 46 create a fluid tight seal between the replacement cover 4 and an upper portion of vessel 2. It should be noted that seal assembly H can be partially assembled prior to installation of vessel 2 in the existing spill containment manhole A such that only tightening of the bolts remains to be performed after installation.

Figure 10:
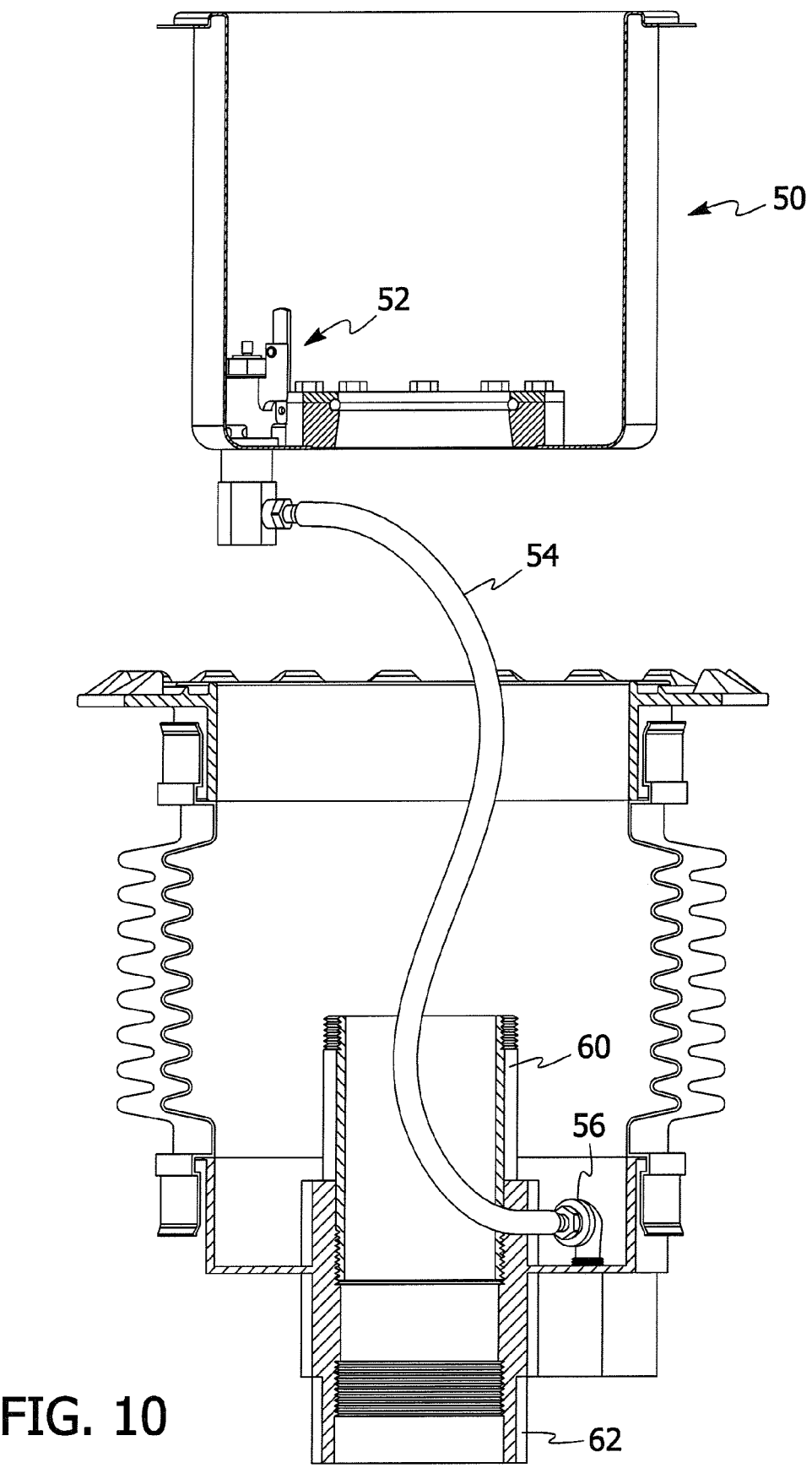
FIG. 10 is a cross-sectional view of a second preferred embodiment of the present invention depicting the containment vessel removed from the existing spill containment manhole.
Figure 11:
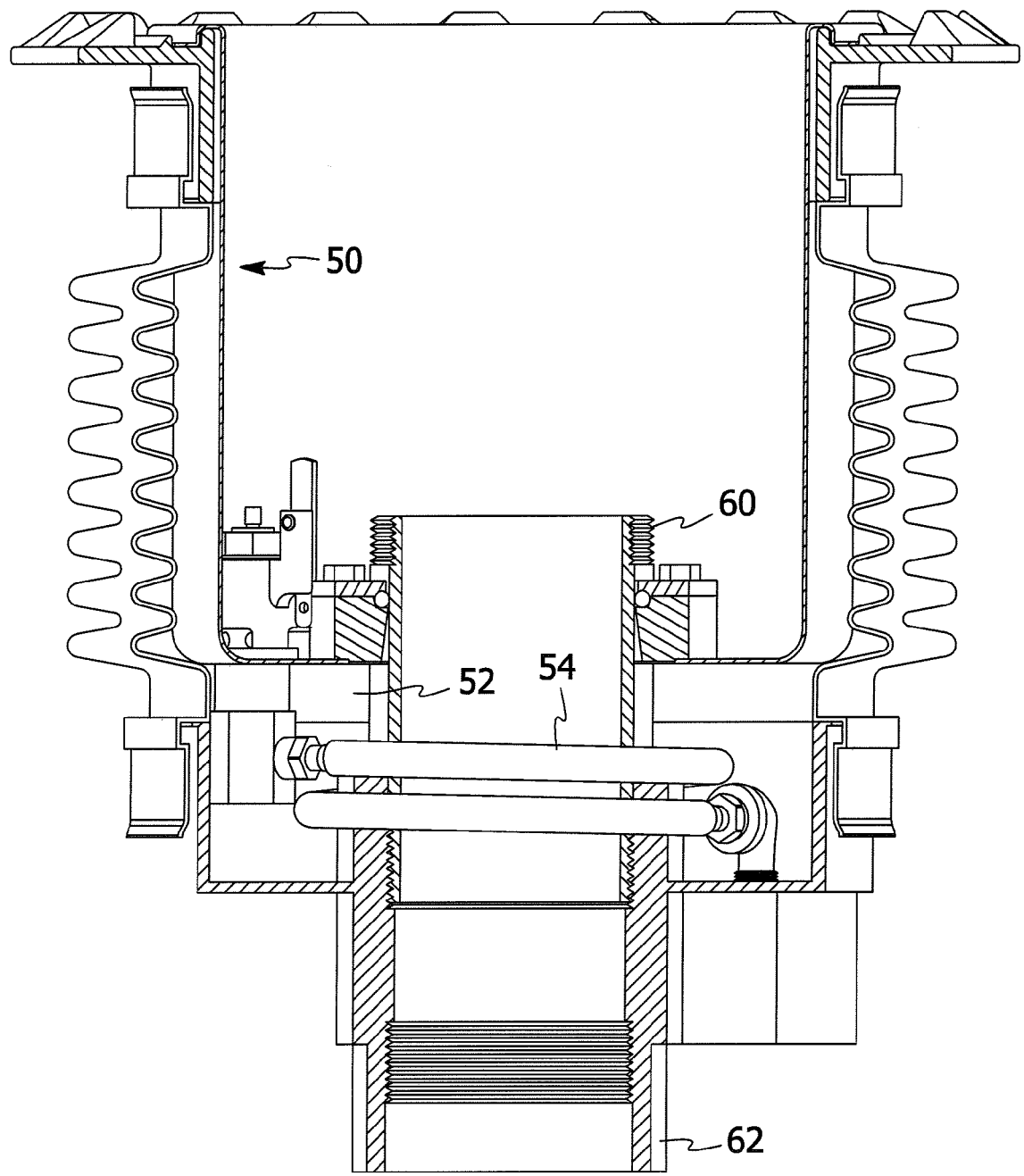
FIG. 11 is a cross-sectional view of the second preferred embodiment of the present invention depicting the containment vessel installed in the existing spill containment manhole.

FIGS. 10 and 11

Referring to FIGS. 10 and 11, an alternative embodiment will now be described. However, due to the similarities between this embodiment and the previously described embodiment, only the differences will be described in detail. Containment vessel 50 is similar to containment vessel 2 with the exception of drain valve 52, drain hose 54 and drain port fitting 56. Hose 54 connects drain valve 52 to drain port fitting 56. Drain port fitting 56 in turn is connected to a drain passageway formed in the existing spill containment manhole.

Like the drain passageway 8 in the first embodiment, fuel traveling downwardly through the drain passageway is emptied back into the underground fuel storage tank. As seen in FIG. 11, hose 54 is configured to wrap around nipple 60 and associated riser pipe coupling 62. Preferably, when drain valve 52 is open fuel collected in containment vessel 50 can drain back into the underground fuel storage tank. When vale 52 is closed, fuel collected in vessel 2 will remain in vessel 2 until such time as drain valve 52 is opened.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A kit for repairing an existing spill containment manhole operably associated with an underground fuel storage tank, said kit comprising:
   (a) a containment vessel for containing fuel spilled during filling of the underground fuel storage tank, a major portion of said containment vessel being adapted to be inserted into an existing spill containment manhole, said containment vessel surrounding an existing pipe section operably associated with the underground fuel storage tank when said containment vessel is installed, said containment vessel including an annular wall, a bottom having an opening for receiving the existing pipe section and a flange, said flange being disposed at the uppermost portion of said containment vessel, said annular wall having an inner surface and an outer surface, said annular wall being continuous and uninterrupted such that said annular wall is free of joints, said annular wall extending from said bottom to said flange; and,
   (b) a replacement cover to replace an existing cover of the existing spill containment manhole, said replacement cover having a first annular portion and a second annular portion, said second annular portion being adapted to extend into said containment vessel when said replacement cover is installed, said first annular portion being disposed above said second annular portion, said replacement cover having at least one sealing member that engages said inner surface of said annular wall of said containment vessel when installed, said at least one sealing member extending outwardly from said second annular portion and being disposed between said second annular portion and said inner surface of said annular wall of said containment vessel.

2. A kit as set forth in claim 1, wherein:
   (a) said sealing member is fixed to said removable cover such that upon removal of said removable cover said sealing member is removed with said removable cover.

3. A kit as set forth in claim 2, wherein:
   (a) said at least one sealing member includes a plurality of sealing ribs each of which extends outwardly from said second annular portion of said replacement cover.

4. A kit as set forth in claim 2, wherein:
   (a) a top surface of said first portion of said replacement cover when said replacement cover is installed is disposed at grade level.

5. A kit as set forth in claim 1, wherein:
   (a) a top surface of said first annular portion has a diameter greater than an inner diameter of an existing cover rim, the existing cover rim is retained in place by one of asphalt and concrete.

6. A kit as set forth in claim 5, wherein:
   (a) said flange is annular and includes a substantially horizontally extending lip that is received in a recess formed in the existing cover rim of an existing containment manhole when said containment vessel is installed.

7. A kit as set forth in claim 6, wherein:
   (a) said substantially horizontally extending lip and said annular wall are formed from a single piece of material.

8. A kit as set forth in claim 7, wherein:
   (a) said substantially horizontally extending lip surrounds an inner annular portion of the existing cover rim of the existing spill containment manhole when said containment vessel is installed.

9. A method of repairing an existing spill containment manhole operably associated with an underground fuel storage tank, said method comprising the steps of:
   (a) providing a containment vessel for containing fuel spilled during filling of the underground fuel storage tank, said containment vessel including at least one vertically extending wall that when installed surrounds an existing pipe section operably associated with the underground fuel storage tank, said at least one vertically extending wall having an inner surface and an outer surface, an uppermost portion of the existing pipe section being disposed below a lowermost portion of a cover rim of the existing spill containment manhole, the cover rim being retained in place by one of concrete and asphalt;
   (b) providing a replacement cover to replace an existing cover of the existing spill containment manhole, said replacement cover having a first annular portion and a second annular portion, said second annular portion being disposed below said first annular portion, said replacement cover having at least one annular seal that engages said inner surface of said at least one wall of said containment vessel and extends outwardly from an outer surface of said second annular portion of said replacement cover, said at least one annular seal being fixed to said replacement cover so that said at least one annular seal moves with said replacement cover;
   (c) removing an existing cover of an existing spill containment manhole from an existing cover rim,
   (d) inserting said containment vessel into the existing spill containment manhole through an opening formed in the cover rim of the existing spill containment manhole without disturbing the existing surrounding retaining structure for retaining the existing rim cover of the existing spill containment manhole; and,
   (e) placing the replacement cover in the existing rim cover so that the annular seal engages an inner surface of said at least one wall of said containment vessel.

10. A method as recited in claim 9, further including the step of:
    (a) performing step (d) of claim 9 such that the existing spill containment manhole is isolated without any sealing substance between an upper annular portion of said at least one vertically extending wall of said containment vessel and an adjacent portion of the existing spill containment manhole.

11. A method as recited in claim 9, wherein:
(a) the existing spill containment manhole has a first volume and said containment vessel has a second volume, said second volume is greater than half of said first volume.

* * * * *